United States Patent Office 2,884,280
Patented Apr. 28, 1959

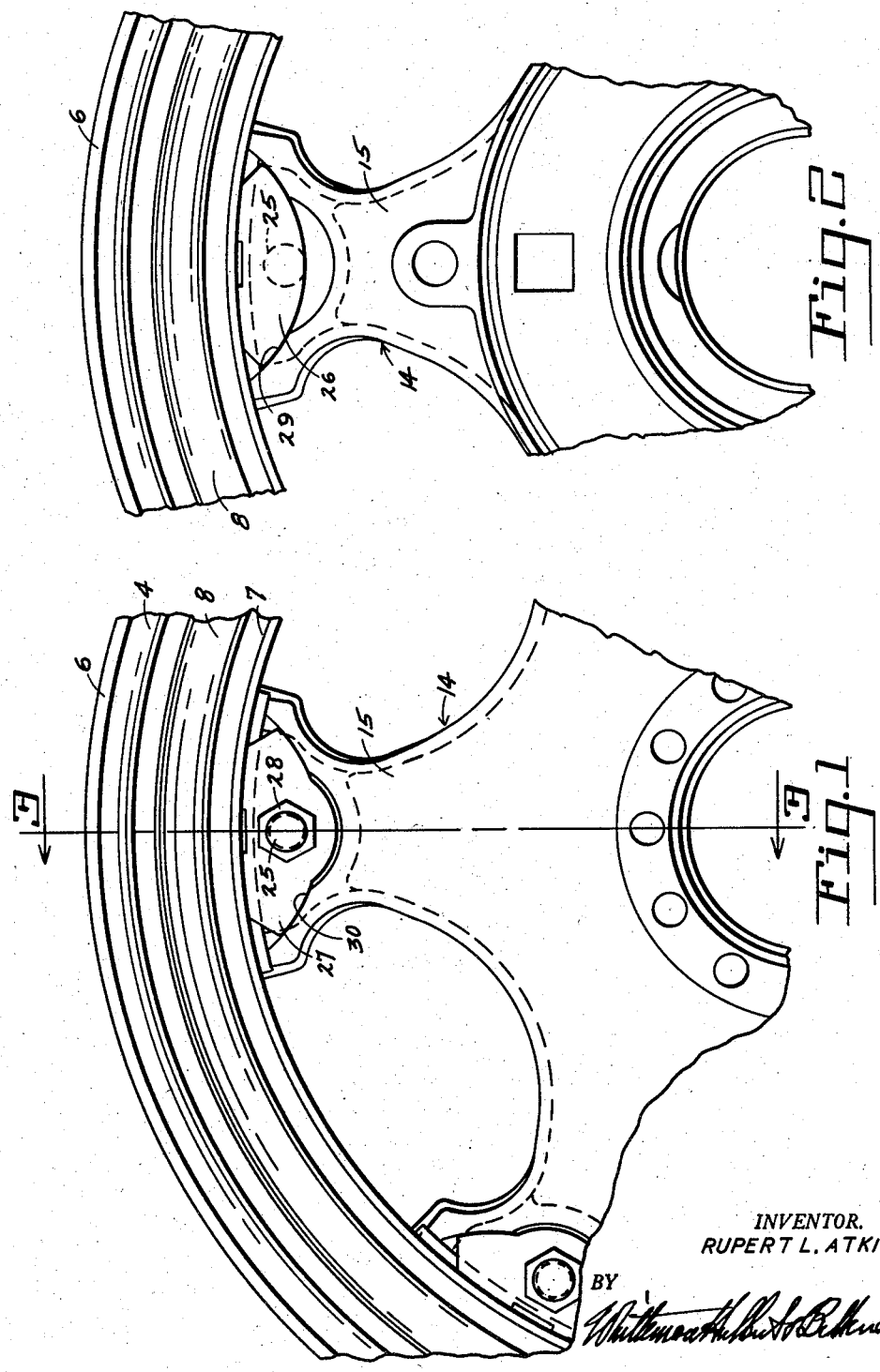

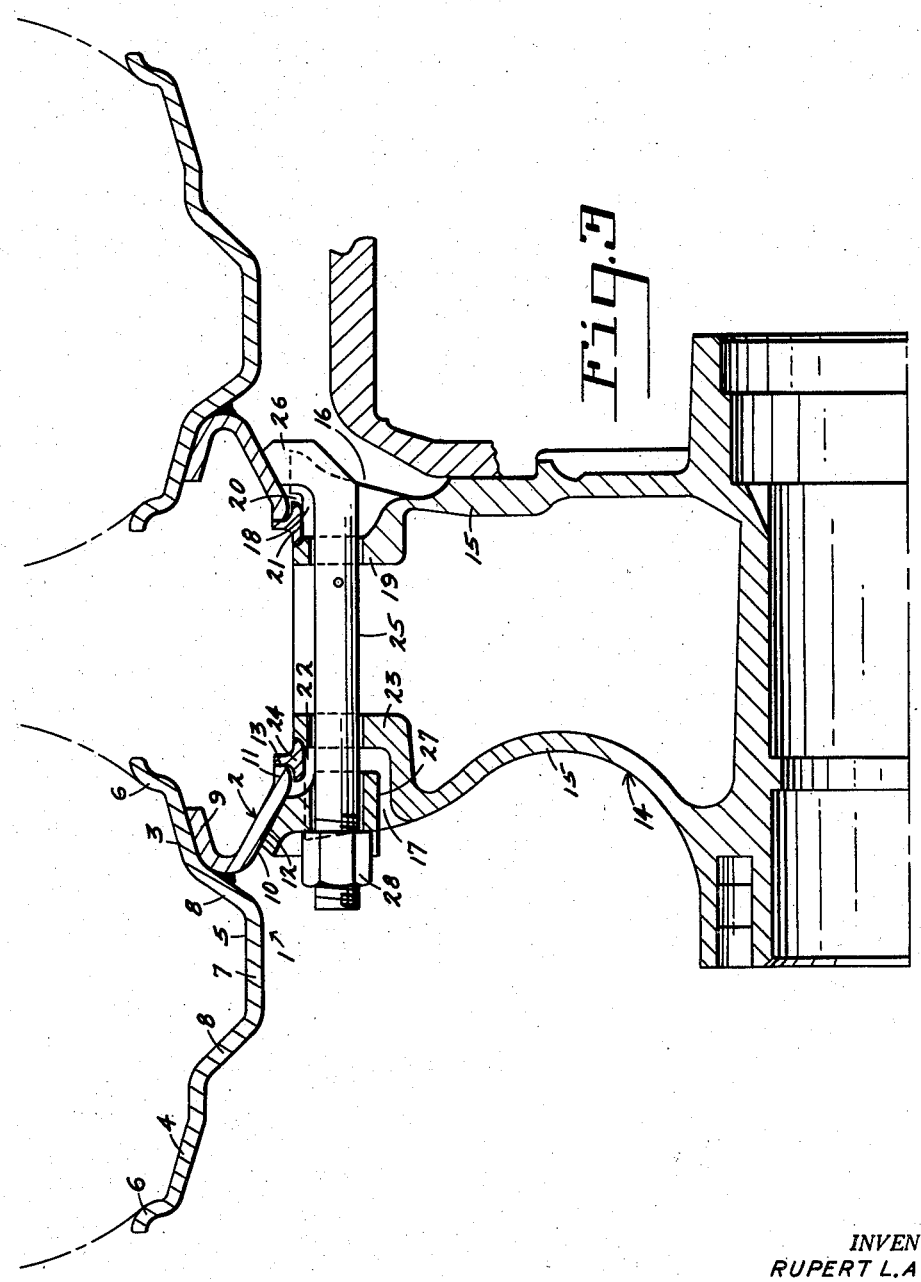

2,884,280

TIRE RIM

Rupert L. Atkin, Grosse Pointe Woods, Mich., assignor to Kelsey-Hayes Company, a corporation of Delaware Application December 29, 1954, Serial No. 478,304

1 Claim. (Cl. 301—10)

The invention relates to tire rims and has for one of its objects to provide an improved tire rim which is of simple construction and adapted to form with a tire casing a tubeless tire.

The invention has for another object to form the rim with a mounting which provides surfaces for engaging a seat and a clamp to secure the rim to a wheel body.

These and other objects of the invention will become apparent from the following description taken in connection with the accompanying drawings in which—

Figure 1 is an outboard elevation of a portion of a wheel having a tire rim embodying the invention;

Figure 2 is an inboard elevation;

Figure 3 is a cross-section on the line 3—3 of Figure 1.

The tire rim comprises the endless annular members 1 and 2. The annular member 1 is of the type having an annular well and has the axially spaced annular tire bead seats 3 and 4, the annular well 5 between and integral with the bead seats, and the annular tire retaining flanges 6 integral with and at the edges of the bead seats spaced from the well. The bead seats 3 and 4 flare outwardly in opposite directions from the well which has the base 7 and the side walls 8.

The annular member 2 is V-shaped in cross-section and opens axially in a direction away from the well 5 of the annular member 1. The annular member 2 has the radially outer portion 9 fitting within the tire bead seat 3, the radially inner portion 10 and the terminal portion 11 at the free edge of the radially inner portion 10. The endless member 2 is permanently secured to the endless member 1 by being welded thereto, preferably by welding the bend joining the portions 9 and 10 to the adjacent well side wall 8. The radially inner portion 10 is frusto-conical and provides the generally radially inwardly facing frusto-conical surface 12, and the terminal portion 11 provides at its edge the annular radial surface 13 with the frusto-conical and radial surfaces engageable with a clamp and a seat to detachably mount the rim on a wheel body.

With this construction, the rim is adapted particularly for use with a tire casing to form a tubeless tire with the annular member 1 forming a part of the tubeless tire and the annular member 2 forming a mounting.

As shown in the present instance, the rim forms part of a dual rim wheel having the wheel body 14 formed with hollow spokes 15 radiating from a hub. The spokes are formed at their radially outer ends with the inboard and outboard pockets 16 and 17 respectively, with the inboard pockets opening radially outwardly and axially inwardly or in an inboard direction and the outboard pockets opening radially outwardly and axially outwardly or in an outboard direction. Each inboard pocket has the side walls 18 and the end wall 19, the radially outer edges of the side walls being formed with the notches 20 for receiving the inboard aligning ring 21. This ring is transversely split and encircles the side walls and abuts the ends walls of all of the inboard pockets. Each outboard pocket has the side walls 22 and the end wall 23 with the radially outer edges of the side walls terminating short of the end wall so that the outboard aligning ring 24 may be readily sleeved over the side walls of the outboard pockets and against their end walls.

The two aligning rings 21 and 24 are alike and are of generally T-shaped cross-section with the stem of the T providing on either side a radial seat for abutment by the radial surface 13 and with the head of the T providing a pilot merging into either side of the stem to function in centering the rim.

To clamp the inboard and outboard rims to the aligning rings, I have provided the bolts 25, the clamps 26 and 27, and the nuts 28. The bolts have shanks which extend freely through openings in the end walls 19 and 23. The clamps 26 slidably engage and are supported by spaced bearings 29 on the side walls 18 of the inboard pockets and these clamps provide radially outwardly facing frusto-conical surfaces of the same angle as and engaging the frusto-conical surface 12 of the inboard rim. The clamps are preferably integral with the bolt shanks at their inboard ends. The clamps 27 slidably engage and are supported by spaced bearings 30 on the side walls 22 of the outboard pockets and provide radially outwardly facing frusto-conical surfaces of the same angle as and engaging the frusto-conical surface 12 of the outboard rim. The clamps 27 are sleeved over the bolt shanks and are abutted by the nuts 28 threaded on the bolt shanks.

From the above description it will be seen that I have provided a rim of the drop-center type formed of two endless annular members and constructed to cooperate with a tire casing to form a tubeless tire. It will also be seen that the rim is of simple construction and may be economically manufactured.

What I claim as my invention is:

A tire rim comprising a one-piece endless annular member having axially spaced tire bead seats, a well between and connecting into the adjacent edges of said tire beads seats, tire retaining flanges at the edges of said tire bead seats spaced from said well, and an endless annular V-shaped mounting permanently and rigidly secured to said member, said V-shaped mounting having one leg fitting radially within and engaging one of said tire bead seats, said V-shaped mounting opening axially in a direction away from said well, the other leg of said mounting being of decreasing diameter toward its free end and having a frusto-conical portion providing a radially inner frusto-conical surface, and a terminal portion at the free end of said frusto-conical portion providing a substantially radially extending end surface, one of said surfaces being engageable with a clamp and the other of said surfaces being engageable with a seat, the bend joining the legs of said V-shaped mounting abutting and being welded to the adjacent side wall of said well to permanently and rigidly secure said mounting to said annular member.

References Cited in the file of this patent

UNITED STATES PATENTS

| | | |
|---|---|---|
| 1,735,290 | Meyer et al. | Nov. 12, 1929 |
| 1,864,701 | Walther | June 28, 1932 |
| 1,966,667 | Holt | July 17, 1934 |
| 2,316,642 | Woodward | Apr. 13, 1943 |
| 2,631,894 | Horn | Mar. 17, 1953 |
| 2,779,631 | Powers | Jan. 29, 1957 |

FOREIGN PATENTS

| | | |
|---|---|---|
| 774,116 | France | Sept. 17, 1934 |